(12) United States Patent
Abdelal et al.

(10) Patent No.: US 8,699,343 B2
(45) Date of Patent: Apr. 15, 2014

(54) ADAPTIVE RATE CONTROL BASED ON OVERLOAD SIGNALS

(75) Inventors: Ahmed Abdelal, North Andover, MA (US); Wassim Matragi, North Andover, MA (US); Nui Chan, Belle Mead, NJ (US); Shaun Jaikarran Bharrat, Manalapan, NJ (US)

(73) Assignee: Sonus Networks, Inc., Westford, MA (US)

( * ) Notice: Subject to any disclaimer, the term of this patent is extended or adjusted under 35 U.S.C. 154(b) by 116 days.

(21) Appl. No.: 12/430,708

(22) Filed: Apr. 27, 2009

(65) Prior Publication Data
US 2010/0271947 A1 Oct. 28, 2010

(51) Int. Cl.
*H04L 12/26* (2006.01)

(52) U.S. Cl.
USPC .......................................................... 370/235

(58) Field of Classification Search
USPC ................................................. 370/229–242
See application file for complete search history.

(56) References Cited

U.S. PATENT DOCUMENTS

| | | | | |
|---|---|---|---|---|
| 4,224,479 | A | 9/1980 | Crawford | 179/18 |
| 4,974,256 | A | 11/1990 | Cyr et al. | 379/113 |
| 5,450,483 | A | 9/1995 | Williams | 379/279 |
| 5,678,007 | A * | 10/1997 | Hurvig | 709/227 |
| 6,018,519 | A | 1/2000 | Ginzboorg | 370/236 |
| 6,377,989 | B1 | 4/2002 | Fukasawa et al. | |
| 6,442,139 | B1 | 8/2002 | Hosein | 370/236 |
| 6,795,864 | B2 * | 9/2004 | Connor | 709/232 |
| 6,826,268 | B2 | 11/2004 | Adams | 379/112.04 |
| 7,522,581 | B2 * | 4/2009 | Acharya et al. | 370/352 |
| 7,747,748 | B2 * | 6/2010 | Allen | 709/226 |
| 7,836,191 | B2 * | 11/2010 | Susai et al. | 709/229 |
| 2003/0023743 | A1 * | 1/2003 | Raphel et al. | 709/232 |
| 2004/0103194 | A1 * | 5/2004 | Islam et al. | 709/225 |
| 2007/0088826 | A1 | 4/2007 | Raphel et al. | |

(Continued)

FOREIGN PATENT DOCUMENTS

WO  WO 04/002109  12/2003

OTHER PUBLICATIONS

Li, Kelvin, et al., "A Measurement-Based Admission-Controlled Web Server," Electrical Engineering and Computer Science Department, University of Michigan, 9 pages.

(Continued)

*Primary Examiner* — Kwang B Yao
*Assistant Examiner* — Juvena Loo
(74) *Attorney, Agent, or Firm* — Straub & Pokotylo; Michael P. Straub; Stephen T. Straub

(57) ABSTRACT

Described are methods and apparatuses, including computer program products, for limiting server overload via client control. A first set of a plurality of requests are transmitted to a server at a first transmission rate during a first period of time. The first transmission rate is limited to be less than or equal to a first transmission limit rate. An overload value is determined based on whether at least two or more requests of the first set of requests for service satisfy an overload criterion. A second transmission limit rate is determined based on the overload value and the first transmission limit rate. A second set of a plurality of requests is transmitted to the server at a second transmission rate during a second period of time. The second transmission rate is limited to be less than or equal to the second transmission limit rate.

37 Claims, 8 Drawing Sheets

(56) References Cited

U.S. PATENT DOCUMENTS

| | | |
|---|---|---|
| 2008/0046558 A1* | 2/2008 | Raja et al. .................... 709/224 |
| 2008/0117816 A1* | 5/2008 | Stone et al. ................. 370/230.1 |
| 2008/0168130 A1* | 7/2008 | Chen et al. .................... 709/203 |
| 2010/0268798 A1* | 10/2010 | Kourkouzelis et al. ....... 709/220 |

OTHER PUBLICATIONS

Whitehead, M.J., et al., "Adaptive Network Overload Controls," BT Technology Journal, vol. 20, No. 3, Jul. 2002, pp. 31-54.

Voigt, Thiemo, et al., "Adaptive Resource-based Web Server Admission Control," Proc. of the Seventh International Symposium on Computers and Communications (ISCC'02), 2002, 6 pages.

Chiu, D., et al., "Analysis of the Increase and Decrease Algorithms for Congestion Avoidance in Computer Networks," Computer Networks and ISDN Systems 17 (1989), pp. 1-14.

Berger, Arthur W., "Comparison of Call Gapping and Percent Blocking for Overload Control in Distributed Switching Systems and Telecommunications Networks," IEEE Transactions on Communications, vol. 39, No. 4, Apr. 1991, pp. 574-580.

"Telecommunications and Internet Converged Services and Protocols for Advanced Networking (TISPAN); Control of Processing Overload; Stage 2 Requirements," ETSI TS 182 018, v2.0.0, Jan. 2008, pp. 1-11.

Hilt, V., et al., "Controlling Overload in Networks of SIP Servers," IEEE, May 2008, pp. 83-93.

Hilt, V., et al., "Session Initiation Protocol (SIP) Overload Control," Sipping Working Group, Internet Draft, Feb. 22, 2008, 31 pages.

Hilt, V., "Design Considerations for Session Initiation Protocol (SIP) Overload Control," SIPPING Working Group, Internet Draft, Oct. 2008, 19 pages.

Rosenberg, J., "Requirements for Management of Overload in the Session Initiation Protocol," SIPPING, Internet Draft, Jul. 14, 2008, 14 pages.

"Telecommunications and Internet Converged Services and Protocols for Advanced Networking (TISPAN); Specification Protocols Required to Support the NGN Overload Control Architecture; Part 3: Overload and Congestion Control for H.248 MG/MGC," ETSI ES 283 039-3, v1.1.2, Jun. 2007, pp. 1-29.

Nahum, E.M., et al., "Evaluating SIP Proxy Server Performance," NOSSDAV 2007, Urbana, Illinois, 6 pages.

Kasera, S., et al., "Fast and Robust Signaling Overload Control," Bell Laboratories, Lucent Technologies, pp. 1-9.

Whitehead, M., "GOCAP—One Standardised Overload Control for Next Generation Networks," BT Technology Journal, vol. 23, No. 1, Jan. 2005, pp. 147-153.

Ohta, M., "Overload Control in a SIP Signaling Network," International J. of Computer Systems Science and Engineering, vol. 3, No. 2, pp. 89-94.

Iyer, R., et al., "Overload Control Mechanisms for Web Servers," Server Architecture Lab, Intel Corporation, 20 pages.

Williams, P.M., et al., "Realising Effective Intelligent Network Overload Controls," BT Technology Journal, vol. 20, No. 2, Jul. 2002, pp. 55-75.

Kasera, S., et al., "Robust Multiclass Signaling Overload Control," University of Utah, 10 pages.

Cherkasova, L., et al., "Session Based Admission Control: a Mechanism for Improving Performance of Commercial Web Sites," Hewlett-Packard Labs, 10 pages.

Hilt, V., et al., "Session Initiation Protocol (SIP) Overload Control," Sipping Working Group, Internet Draft, Oct. 26, 2007, 27 pages.

Shen, C., et al., "Session Initiation Protocol (SIP) Server Overload Control: Design and Evaluation," Columbia University, 26 pages.

Schwartz, M., "Telecommunication Networks, Protocols, Modeling and Analysis," pp. 594-605.

Schulzrinne, H., et al., "The Session Initiation Protocol: Internet-Centric Signaling," IEEE Communications Magazine, Oct. 2000, pp. 134-141.

Bhoj, P., et al., "Web2K: Bringing QoS to Web Servers," Hewlett Packard Laboratories Palo Alto, HPL-2000-61, May 2000, 21 pages.

Bhatti, N., "Web Server Support for Tiered Services," Hewlett-Packard Research Labs., pp. 1-16.

ITU-T H.248.11, "Gateway control protocol: Media gateway overload control package," Nov. 2002, 24 pages.

PCT International Search Report for PCT/US2010/032563, Nov. 5, 2010.

* cited by examiner

ADAPTIVE RATE CONTROL BASED ON OVERLOAD SIGNALS

FIELD OF THE INVENTION

The invention relates generally to methods and apparatuses, including computer program products, for adaptive rate control based on overload signals.

BACKGROUND OF THE INVENTION

Efficient communication systems are becoming increasingly important as the demand for communication services increases. Communication services can range from the processing of telephone call setup requests, to the routing of Internet Protocol (IP) data packets over networks, to the processing of Hypertext Transfer Protocol (HTTP) requests for websites and/or content. Communication systems generally include servers to process requests for services from clients. Servers can range from telecommunication switches for processing of telephone call setup requests, to network routers for routing of IP data packets, to web and/or content servers for processing HTTP requests, and the like.

Occasionally, service requests may arrive at a server at a rate faster than the server can process the requests. The rate of the server processing the requests can change due to one or more of the following: variations in processing demands of different requests, background or administrative activities that run on the server, and/or partial or full failure of software or hardware elements in the server. Communication servers typically implement overload controls to maintain the throughput of service request processing at the server at acceptable levels during these periods of high demand.

Some types of servers can experience prolonged overload due to high rates of incoming service requests and/or partial network failures. Overloads can be caused by the following (either individually or in combination): (1) media-stimulated mass-calling events (e.g., tele-votes, charity appeals, competitions, marketing campaigns, and/or the like); (2) emergencies; (3) network equipment failures; and/or (4) auto-scheduled calling (e.g., snow-day cancellation alerts). In the absence of overload control, such overloads can threaten the stability of a communication network, and can cause a severe reduction in successful service completions. Ultimately, server(s) can fail to provide service(s) due to lost requests resulting in the unavailability of services to clients. Often, overload problems can compound themselves, which can cause even more load on a server(s). Furthermore, during overload, the overall capacity of a server(s) can go down, since much of their resources are spent rejecting and/or treating load that they cannot actually process. Under severe overload, the throughput can drop down to a small fraction of the original processing capacity. This is often called congestion collapse. In addition, overload tends to cause service requests to be delayed and/or lost, which can trigger high rates of client abandons and/or reattempts.

Servers can be equipped with some form of adaptive overload detection and control in order to protect against high and unpredictable levels of demand and to keep response times low enough during processing overload to preclude clients from abandoning their service requests prematurely. Some servers implement internal overload control mechanisms, where an overloaded server can reject new requests to maximize successful completion of admitted sessions. Other servers can implement external overload control mechanisms, where servers can control the rate (e.g., set a restriction on the request rate) at which clients can send additional requests for service by communicating control messages to one or more clients.

However, server-implemented internal and external mechanisms as described above (also known as "receiver-based" control mechanisms) can only protect servers against overload to a limited extent, and have difficulties preventing congestion collapse. In particular, receiver-based control mechanisms require the server to maintain and update the restrictions for clients based on the server's internal overload level and then distribute these restrictions via an overload feedback mechanism to clients. Restrictions can include, for example, explicit rate messages, overload window size messages (that limit the number of messages that can be in transit towards the server without being confirmed), and/or loss percentage messages (by which clients should reduce the number of requests they would normally forward to a server). All receiver-based schemes require monitoring the activity of clients to update its distribution list, which can include adding a new client to the server's distribution list when the new client appears, and removing an existing client when that client stops transmitting for a suitable amount of time. Each of these requirements add processing burden to the already overloaded server.

In addition, in explicit rate and overload window schemes, an overloaded server continuously evaluates the amount of load it receives from each upstream neighbor and accordingly assigns a suitable rate cap or overload window size, which should timely be sent back to the transmitting clients to update their restriction levels. Receiver-based schemes that feed back the loss percentage may not impose similar overhead on an overloaded server, because the same loss percentage can be sent to all the upstream neighbors thus dropping the requirement to track the request rate it receives from each client. However, loss percentage schemes may not provide efficient control, because as upstream clients apply the loss percentage on the request rate towards the overloaded server, which can fluctuates quickly, the request rate towards the overloaded server can also fluctuate quickly. These fluctuations require the overloaded server to be able to quickly adapt the throttle percentage to its current load.

Another drawback of receiver-based controls is that they may require changes to the particular protocol stack at the clients and the server(s) in order to implement an overload feedback mechanism. For example, the SIP stack of a server may be required to include a new SIP overload response header or new overload event package. Changes to the protocol stack can slow down the adoption of such controls.

SUMMARY OF THE INVENTION

One approach to controlling server resources during overload is to limit server overload via client control. In one aspect, there is a computerized method for limiting server overload via client control. The method includes transmitting a first set of a plurality of requests for services to a server at a first transmission rate during a first period of time, and limiting the first transmission rate to be less than or equal to a first transmission limit rate during the first period of time. The method also includes determining an overload value based on whether at least two or more requests of the first set of requests for service satisfy an overload criterion, and storing the overload value in a computer memory module. The method also includes determining a second transmission limit rate based on the overload value and the first transmission limit rate. The method also includes transmitting a second set of a plurality of requests for services to the server at a second transmission rate during a second period of time after the first period of time, and limiting the second transmission rate to be less than or equal to the second transmission limit rate during the second period of time.

In another aspect, there is a system for limiting server overload via client control. The system includes a buffer, a transmitter, and a controller. The buffer is configured to store a first set of a plurality of requests for service. The transmitter is coupled to the buffer and is configured to transmit the one or more requests for service to a server at a transmission rate less than or equal to a transmission limit rate during a first period of time. The controller includes a computing means for determining an overload value based on whether at least two or more requests of the first set of requests for service satisfy an overload criterion. The controller also includes a computing means for adjusting the transmission limit rate based on the overload value and the transmission limit rate.

In another aspect, there is a computer program product. The computer program product is tangibly embodied in a machine-readable storage device and includes instructions being operable to cause a data processing apparatus to transmit a first set of a plurality of requests for services to a server at a first transmission rate during a first period of time, and to limit the first transmission rate to be less than or equal to a first transmission limit rate during the first period of time. The computer program product also includes instructions being operable to cause the data processing apparatus to determine an overload value based on whether at least two or more requests of the first set of requests for service satisfy an overload criterion, and to store the overload value in a computer memory module. The computer program product also includes instructions being operable to cause the data processing apparatus to determine a second transmission limit rate based on the overload value and the first transmission limit rate. The computer program product also includes instructions being operable to cause the data processing apparatus to transmit a second set of one or more requests for services to the server at a second transmission rate during a second period of time after the first period of time, and to limit the second transmission rate to be less than or equal to the second transmission limit rate during the second period of time.

In other examples, any of the aspects above can include one or more of the following features. It can be determined whether the overload value is less than or greater than a target overload value. If the overload value is greater than the target overload value, determining the second transmission limit rate can include reducing the first transmission limit rate by an amount proportional to the difference between the overload value and the target overload value. If the overload value is greater than the target overload value, determining the second transmission limit rate can include reducing the first transmission limit rate by an amount proportional to the overload value or to the deviation of the overload value from the target overload value.

In some embodiments, the overload value can represent a rate of requests satisfying the overload criterion. If the overload value is less than the target overload value, determining the second transmission limit rate can include increasing the first transmission limit rate by a rate step. The rate step can be fixed. The rate step can be based on the first transmission limit rate. The rate step can be bounded by a maximum rate step and a minimum rate step. A first layer entity can determine the overload value and a second layer entity can limit the first transmission rate. The first layer entity can be different from the second layer entity. The first layer entity can include a transport layer entity and the second layer entity can include an application layer entity.

The overload criterion can be an explicit overload criterion. The explicit overload criterion can apply to a single request only. The explicit overload criterion can specify a non-throttling client response. In yet other embodiments, a first request for service from the first set can satisfy the explicit overload criterion if a first rejection message associated with the first request is received.

The overload criterion can be an implicit overload criterion. A first request for service from the first set can satisfy the implicit overload criterion if the elapsed time since the first request was transmitted is greater than a delay threshold. The implicit overload criterion can be satisfied if a fraction of outstanding requests for service in a time interval is equal to or greater than a fractional threshold value. The implicit overload criterion can be based on one or more response messages from the server that are not associated with peer congestion. The implicit overload criterion can be satisfied if a fraction of the one or more responses is equal to or greater than a fractional threshold value. The implicit overload criterion can be based on a change in a fraction of the one or more responses that are equal to or greater than a fractional threshold value.

The delay threshold can be static. The delay threshold can be based on an average response time to one or more prior requests for services transmitted to the server. The delay threshold can be based on a percentile response time to one or more prior requests for services transmitted to the server. A first request for service from the first set can satisfy the overload criterion based on whether a second response to a second request for service from the first set is received before a first response to the first request is received, wherein the second request was transmitted to the server after the first request.

In some embodiments, determining the overload value can include averaging and/or filtering the number of requests from the first set that satisfy the overload criterion. Determining the overload value can be further based on one or more prior overload values associated with one or more periods of time prior to the first period of time. The first period of time can be separated from the second period of time by a blind interval period of time. The blind interval period of time can be a fixed interval of time and/or can be based on an average response time to one or more prior requests for services transmitted to the server.

In some embodiments, transmitting the first set of requests can include prioritizing transmission of the one or more requests based on request type. Request type of the one or more requests can include: high priority, regular, or any combination thereof. The first and second set of requests can be of the same classification and/or type. The first set of requests can include at least requests of a first and second classification and/or type. The second set of requests can include only requests of the first classification and/or type. The first classification and/or type can include automatic retransmissions of one or more service requests.

In other examples, any of the features above relating to a method can be performed by a system, and/or a controller of the system, configured to or having means for performing the method. In addition, any of the features above relating to a method can be performed by a computer program product including instructions being operable to cause a data processing apparatus to perform the method.

Any of the above implementations can realize one or more of the following advantages. By distributing overload control to clients, the offered load to servers can be reduced to a level that can maximize server throughput. The implementations can be designed to have clients suppress some service requests before they reach an overloaded server, which can result in protecting the overloaded system from more extreme overloads and/or can enable the server to operate at near optimum load for the entire duration of an overload event. Other implementations can bound the response times, which can advantageously help control stability by reducing feedback delay of service requests. Furthermore, client-based control can advantageously reduce the burden on servers that update and/or distribute restriction level control messages to clients by shifting the processing burden to clients. Additional implementations can be designed that advantageously do not require changes in the servicing protocol (e.g., SIP). In addition, client-implemented overload control can be completely implemented on the client system, which advantageously lessens the processing burden on overloaded servers. Because the performance of servers can be critical to the operation of a service-oriented infrastructure, client-implemented overload control techniques advantageously can reduce the latency of media applications (e.g., initiating a phone call) and can maintain a maximum, or substantially maximum, throughput even when a server is subjected to overload.

Client-implemented overload control techniques, including methods and apparatuses, can satisfy, for example, one or more of the following requirements: (1) automatically maximize the throughput at an overloaded server; (2) achieve high throughput throughout the duration of an overload event; (3) during overload, a high proportion of response times are low enough so as not to cause clients to prematurely abandon service requests; and/or (4) react quickly to changes in workloads.

The details of one or more examples are set forth in the accompanying drawings and the description below. Further features, aspects, and advantages of the invention will become apparent from the description, the drawings, and the claims. The drawings are not necessarily to scale, emphasis instead generally being placed upon illustrating the principles of the invention.

BRIEF DESCRIPTION OF THE DRAWINGS

The advantages of the invention described above, together with further advantages, will be better understood by referring to the following description taken in conjunction with the accompanying drawings. The drawings are not necessarily to scale, emphasis instead generally being placed upon illustrating the principles of the invention.

DESCRIPTION OF THE INVENTION

I. Network Overview

Figure 1:
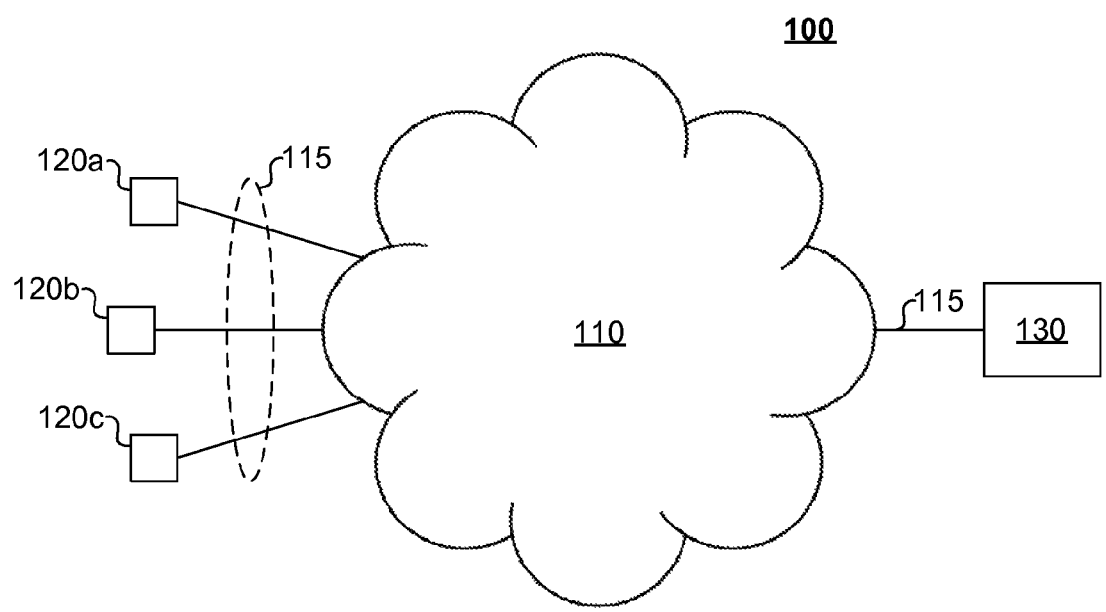
FIG. 1 is a block diagram showing an exemplary network with devices relating to servers processing service requests from clients.

FIG. 1 is a block diagram showing an exemplary network 100 with devices relating to servers processing service requests from clients. Network 100 includes transmission medium 110, one or more clients 120a, 120b, and/or 120c, generally 120, and at least one server 130. Transmission medium 110 (e.g., a communications network) is responsible for the transfer of information, including requests for services, between one or more clients 120 and/or server 130. As described in more detail below, the clients 120 are configured according to some of the inventive techniques described herein.

Transmission medium 110 can be coupled to clients 120 by connections 115. Clients 120 can be any devices capable of requesting one or more services from server 130. Clients 120 can include user devices such as computers, telephones, IP phones, mobile devices (e.g., cellular phones, personal digital assistant (PDA) devices, laptop computers, and/or the like), and/or other communication devices. In some embodiments, one or more clients 120 can also perform one or more server functions, and therefore can be considered as server(s) different from server 130. For example, in telecommunication networks, a telecommunication switch, such as an end office or a tandem switch, can act as a server and/or as a client to any neighboring telecommunication switch, which can, respectively, act as a client requesting a service such as a call setup and/or as a server. In another example, IP routers or network switches can act as servers and/or clients to any neighboring or remote IP routers or network switches, which can respectively act as clients and/or servers. As a client, the neighboring or remote IP device can request transmission of IP packets and/or send gateway control requests. In yet another embodiment, clients 120 and server 130 can be located in the same computing device, either physically and/or logically. For example, a computer can run multiple tasks, programs, and/or processes, in which case a single processing unit in server 130 is responsible for processing services for each of the tasks, programs, and/or processes which act as clients 120. In this example, transmission medium 110 can include an internal bus if clients 120 are separate from the processing unit (i.e., server 130).

Connections 115 can include electrical wires, optical fibers, and/or wireless transmissions. Connections 115 can also include one or more intermediary devices that connect clients 120 to network 110. Clients 120 can be identified by a unique and/or shared identifier. A unique client identifier can be, for example, a telephone number, an IP address, and/or the like. A shared client identifier can be, for example, a network address, an area code, a country code, a service identifier, and/or the like.

Service identifiers can be unique codes that classify a particular service request into one more classes of services. Service requests can also be classified based on the type of request being requested. For example, service requests can be classified as either being a request message requesting a new session or a request message requesting an update or modification to an existing session. Service requests can also be classified on whether they are a retransmission of a previously transmitted request message (e.g., if a time-out condition instructs the client to retransmit a request). In another example, service requests can be classified as either a request message that does not require a database lookup or a request message that requires one or more database lookups to process. In yet another example, service requests can be classified based on the level of subscription a client has registered for. In yet a further example, service requests can be classified as either related to e-commerce purchase activities or non-e-commerce activities, such as browsing activities. In yet another example, service requests can be classified as being: priority requests, regular requests, or low-priority requests. In general, the priority of requests can be classified into any number of levels (e.g., assigning a priority level from 0 to 10).

Serving different classes of services can consume different resources of server 130, such as, for example, memory, disk bandwidth, communication bandwidth, and/or processing cycles. In an alternative embodiment, because classification of clients 120 and/or the service requests can be optional, clients 120 and/or the service requests do not have to be identified or classified by an identifier.

Transmission medium 110 can also be coupled to server 130 by a connection 115. Server 130 can be responsible for providing one or more types of services to one or more clients 120 by processing respective requests for these services from clients 120. Server 130 can include, for example, a web server, an application server, a media server, a gateway, a softswitch, a telecommunications switch (e.g., a toll or tandem switch), a network router or switch, and/or the like. In some embodiments, in a Peer-to-Peer network for example, server 130 can also request one or more services from other servers (not shown), and therefore can be considered as a client different from clients 120.

Types of services provided by server 130 can include, for example, voice services, video services, data services, multimedia services, and/or other electronic services. Voice services can include, for example, the establishment, maintenance, and release of services associated with telecommunication networks. For example, a SS7 IAM message, a SIP protocol INVITE message, or a H.323 SETUP message can be requests to initiate a new telephone call or call session. Likewise, a SIP protocol UPDATE message can be a request to update the state of an existing call session. Video services can include, for example, the establishment, maintenance, and release of streaming video over the Internet. Streaming video can include real-time video and/or on-demand video. Data services can include, for example, web sites (processing HTTP requests), packet routing (routing IP packets), and/or general content delivery. Other services can include, for example, one or more video, audio, and/or data services. In other embodiments, for example, there can be a web server for flight reservation systems, one or more audio servers, e-mail servers, collaboration servers, authentication servers, and/or other server(s).

In particular, protocols such as the Session Initiation Protocol (SIP) and H.323 can be used to create, maintain, and/or tear down sessions for various types of media, including, for example, voice, video, and/or text. SIP can be used for many media-oriented applications such as, for example, Voice over IP (VoIP), voicemail, instant messaging, presence, IPTV, network gaming, etc. SIP can also be used as the core protocol for the IP Multimedia Subsystem (IMS), which is a basis for the 3rd-Generation Partnership Program (3GPP) for both fixed and wireless telephone networks.

In one embodiment, for example, server 130 can be a web server that hosts one or more web sites available to clients 120 over the Internet. In another configuration, server 130 can be a tandem switch on the PSTN that receives and processes SS7 signaling messages for setting up and tearing down telephone calls. In another configuration, server 130 can be a MGCP Media Gateway or a H.248/MEGACO Media Gateway that respectively receive requests from Call Agent(s) or Media Gateway Controller(s) (MGCs). In yet another configuration, server 130 can be an application server for processing database requests from other clients 120 on network 110. In other configurations, server 130 can be, for example, Sonus Networks PSX™, ASX™, GSX™/NBS, and/or AGCF servers.

II. Client-Implemented Overload Control

According to some embodiments of the present invention, external overload control can be implemented at clients 120. Client-implemented overload control can advantageously allow clients 120 to reduce offered load to the overloaded server 130, while not sacrificing processing burden at server 130 for overload control purposes, such that server 130 throughput can be maximized. For example, each client 120 can determine an overload value, based on explicit and/or implicit overload criterions, that is representative of the overload at server 130. Using this determined overload value as feedback, client 120 can appropriately adjust a rate of transmitting requests for service to server 130. For example, the transmission rate of service requests to server 130 can be made inversely proportional to the determined overload value. Therefore, client-implemented overload controls can obviate and/or supplement the need for server 130 to allocate processing resources for overload control purposes (e.g., internal overload control), and instead allocate a maximum amount of resources for processing service requests thereby increasing throughput.

Figure 2:
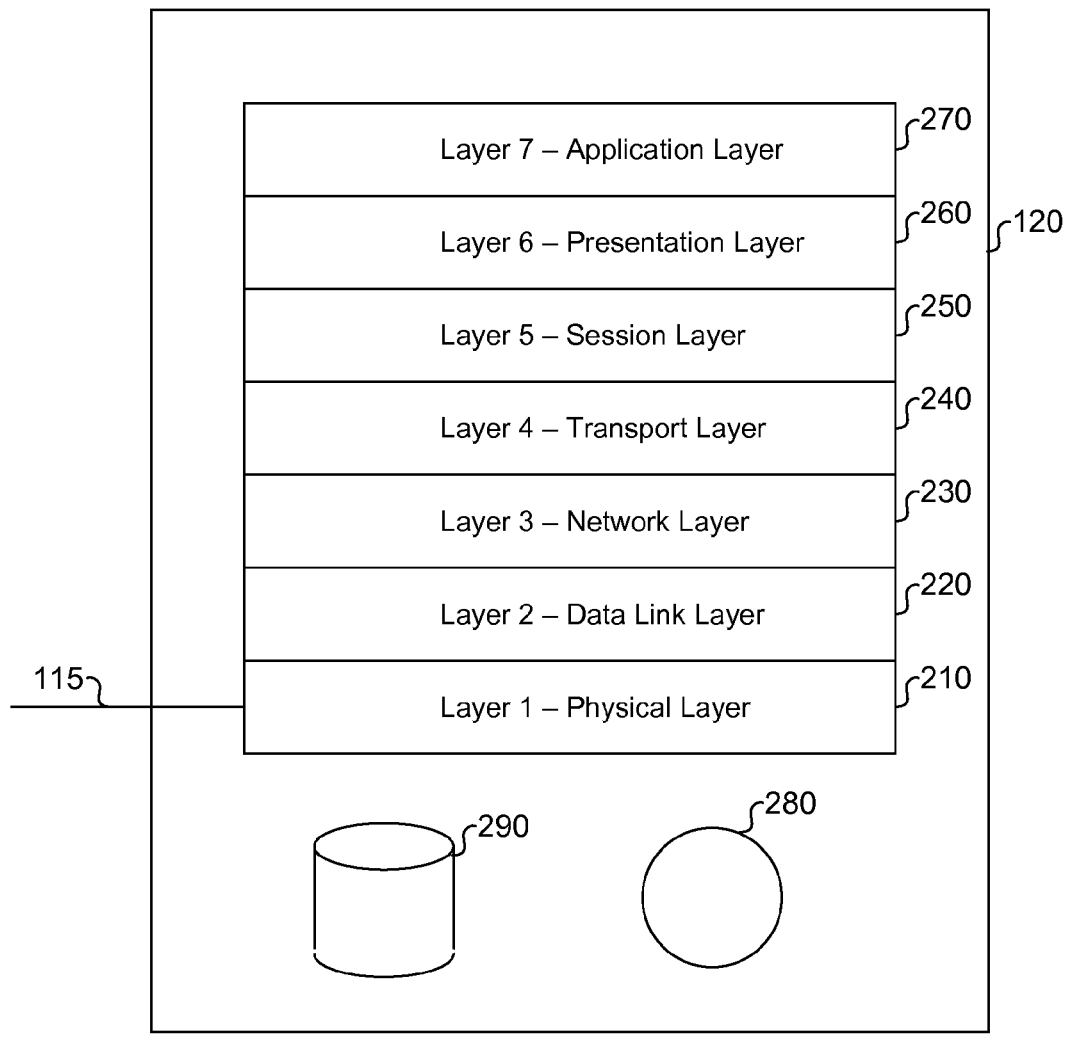
FIG. 2 is a block diagram showing the components of a client.

In general, the generation and/or origination of service requests for services can take place at any layer in a communication protocol stack. FIG. 2 is a block diagram 200 showing the components of client 120. Client 120 includes at least one controller 280, at least one computer memory module 290, and can include one or more protocols conforming to one or more layers 210-270 of the Open Systems Interconnection (OSI) Reference Model (as defined in ITU-T Recommendation X.200). The OSI Reference Model is an abstract description for a communication system, which can be divided into seven layers: a physical layer 210, a data link layer 220, a network layer 230, a transport layer 240, a session layer 250, a presentation layer 260, and an application layer 270. Within each layer, one or more entities can implement a collection of similar functions that provide services to another layer above or below the layer.

Physical layer 210 can provide mechanical, electrical, functional and procedural specifications to activate, maintain, and de-activate physical-connections for bit transmission between data-link-entities. Data link layer 220 can provide functional and procedural specifications for establishment, maintenance, and release of data-link-connections among network-entities and to detect and possibly correct errors that occur in physical layer 210. Network layer 230 can provide specifications to establish, maintain, and terminate network-connections between sources and destinations on one or more networks, and functional and procedural specifications to exchange data between the sources and destinations. Transport layer 240 can provide transparent transfer of data between session-entities and relieves them from any concern with the detailed way in which reliable and cost effective transfer of data is achieved. Transport layer 240 can also optimize the use of the available network-service to provide the performance required by each session-entity at minimum cost. Session layer 250 can provide specifications that control the dialogues/connections between entities. Session layer 250 can also provide services to establish a session-connection between two presentation-entities, to support orderly data exchange interactions, and to release the connection in an orderly manner. Presentation layer 260 can provide for the representation of information that application-entities either communicate or refer to in their communication. Application layer 270 can interact with the software application resident on client 120.

The client 120 illustrated in FIG. 2 includes a protocol stack modeled with respect to the seven layers of the OSI Reference Model, but other models and/or layers can also be used. For example, a client 120 can include protocols conforming to only layers 210-230 (e.g., a router or a layer 3 switch). In addition, other models can also be used, such as the TCP/IP model of the Internet, which includes four abstraction layers (link layer, internet layer, transport layer, and application layer). In general, communication protocols do not have to necessarily fall under one of the abstraction layers 210-270, but can, in some cases, be included in more than one layer.

As described above, requests for service can originate from and/or be generated by one or more protocols in the protocol stack 210-270 of client 120. Controller 280 can implement overload controls in one or more of the layers of the protocol stack 210-270 to help maintain the throughput and/or delay of service request processing at server 130. In some embodiments, controller 280 can be a processor or an apparatus. In other embodiments, controller 280 can be a logical function executed by another processor or apparatus in client 120. As a processor, controller 280 can be configured to execute a computer program to perform the described techniques by operating on input data and/or generating output data. Processors suitable for the execution of a computer program include, by way of example, both general and special purpose microprocessors, and any one or more processors of any kind of digital or analog computer. A processor can receive instructions and data from, for example, a read-only memory or a random access memory or both.

As an apparatus, controller 280 can be implemented as special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), an ASIC (application-specific integrated circuit), or the like. Subroutines can refer to portions of the stored computer program and/or the processor and/or the special circuitry that implement one or more functions.

In FIG. 2, controller 280 is illustrated to be separate from the protocol stack 210-270, but other configurations can also be used. For example, controller 280 can be incorporated into one or more entities (e.g., the protocols or layers) in the protocol stack 210-270 (e.g., the application layer 270) or the protocol stack 210-270 can be included in controller 280. In some embodiments, a controller 280 incorporated in one layer can be provided signals from one or more other protocols or layers in the protocol stack 210-270. For example, a controller 280 incorporated into the application layer 270 can implement overload control based on signals from the transport layer 240.

Controller 280 can be communicatively coupled to computer memory module 290. Computer memory module 290 can include one or more memory devices or memory sub-modules for storing instructions and/or data. Memory devices, such as a cache memory, can be used to temporarily store data. Memory devices can also be implemented as mass-storage devices. Controller 280 and computer memory module 290 can be supplemented by and/or incorporated in special purpose logic circuitry.

Figure 3:
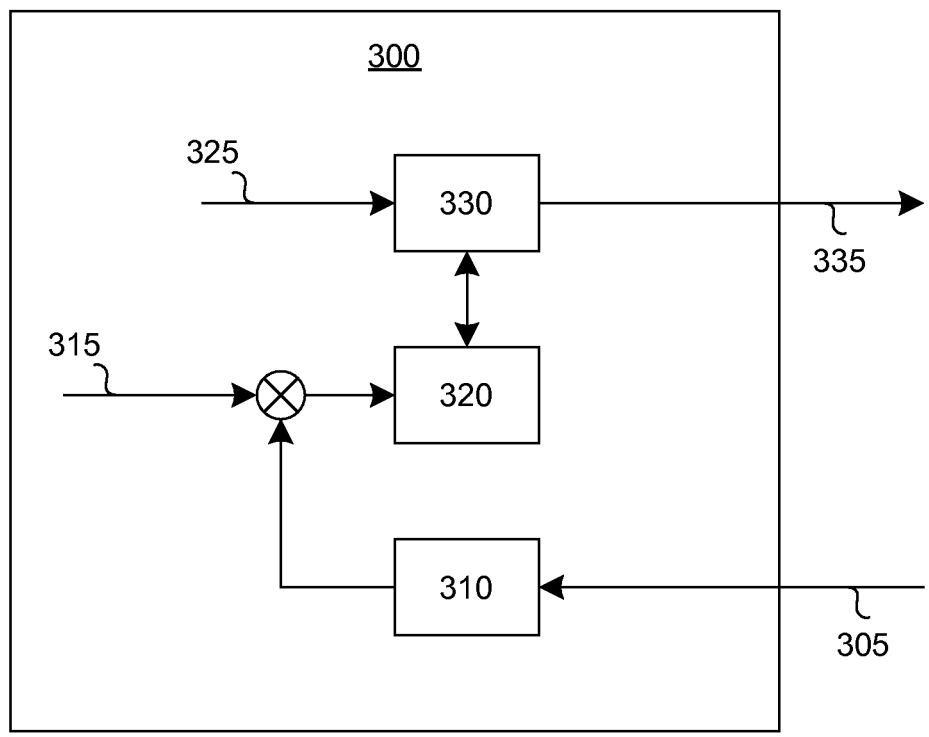
FIG. 3 is a block diagram showing the components of a model control loop.

Client-based overload control can be implemented hop-by-hop or end-to-end. Hop-by-hop can include a separate control loop between all neighboring clients 120 and servers 130 that directly exchange traffic. End-to-end can include a control loop along the entire path of a service request. FIG. 3 is a block diagram showing the components of a model control loop 300. Model control loop 300 can represent, either physically or logically, how a client-based overload control scheme is implemented in one or more layers of the protocol stack 210-270 of client 120. Model control loop 300 includes a sensor/filter 310 that can receive a feedback signal/value 305 and/or create an implicit feedback value (not shown). Sensor/filter 310 is coupled to a control unit 320 with a reference input 315. Control unit 320 is coupled to an actuator 330 (e.g., a restrictor), which can electronically adjust the rate at which internal service requests 325 (e.g., offered load) are output 335. Control unit 320 can determine and submit to actuator 330 the rate setting based on the difference between the feedback value from sensor/filter 310 and reference input 315. Reference input 315 (e.g., a target overload value) can be the desired value for the system output 335. Reference input 315 can be fixed and/or can be variable. For example, reference input 315 can be based on the capacity of server 130. Feedback value 305 and/or system output 335 can be, respectively, received from or sent to connection 115 and/or from one or more of the layers of the protocol stack 210-270.

Sensor/filter 310 can determine (e.g., measure) an overload value, which can be a rate of explicit overload signals or notifications (e.g., SIP 503 (Service-Unavailable), H.323/Q.931 cause code 42, or H.248 overload notifications) received from server 130, and/or can be a rate of implicit overload values (e.g., request timeouts). Implicit overload notifications can also include messages received from server 130 that are not intended for overload control purposes (e.g., SIP 480 (Temporarily Unavailable) or H.323/Q.931 41 (Temporary Failure)). Additional overload notification mechanisms can be used to convey overload feedback to clients 120, including, for example, a special SIP response header or a SIP overload event package. The SIP overload event package can enable a sending entity to subscribe to the overload status of a server and receive notifications of overload control status changes in NOTIFY requests.

In some embodiments, the rate of overload notifications (explicit and/or implicit) can be passed through an averaging filter (e.g., included in sensor/filter 310) to smooth the measurements. The average overload notification rate can then be compared to a target overload value 315, and the difference can be used to drive controller 320. Controller 320 can adjust the allowed rate (control input) of service requests 335 towards server 130 so as to cause the overload notification rate 305 (feedback value) (and/or an implicit overload value) to converge close to target overload value 315, which can have a small value. The rejection rate can be a good feedback value as it can reflect the load level on the target system (e.g., server 130). As the load increases on server 130, the internal overload control scheme of server 130 rejects more service requests, thus the rate of receiving overload notifications can increase as well, and the rate of change in the rejection can be close to the rate of change of the offered load.

In general, overload notifications measured by sensor/filter 310 can be either explicit and/or implicit. In some embodiments, an explicit overload value can represent, for example, receipt of a SIP request rejection via 503 Service Unavailable responses. An implicit overload value can represent, for example, the lack of response to a service request. In one embodiment, implicit overload criterion can be achieved by tracking the fraction of outstanding requests for service (e.g., requests for which no response has been received). If a fraction of outstanding requests for service in a time interval is equal to or greater than a fractional threshold value, then an overload criterion can be satisfied. Implicit detection can also be achieved, for example, by client 120 starting a timer each time a service request is sent. The timer can be cancelled if a response to the service request is received before a time-out expires. In some embodiments, the duration of the time-out can be set a little greater than the response time that would be expected for a high load at server 130. Sensor 310 can measure the rate of implicit and/or explicit overload notifications from overloaded server 130. In some embodiments, the measured rate can be averaged via an exponential weighted moving average (EWMA) low-pass filter. Filter 310 can smooth the stochastics of the measurements and ensure that the control will not be activated by an occasional burst of overload notifications. The EWMA filter can be described as follows:

$$O_{avg}(n+1) = (1-w)O_{avg}(n) + wO_m(n)\ 0 \leq w < 1, \quad (1)$$

where $O_m(n)$ can represent the measured overload value at time n, $O_{avg}(n)$ can represent the average overload value at time n, and the weight w can represent the time constant of the low-pass filter.

In some embodiments, sensor/filter 310 can measure overload notifications for one or more particular classes of service requests. For example, sensor/filter 310 can determine an overload value for regular service requests only. Alternatively, sensor/filter 310 can determine an overload value for all service requests with a priority value less than a predetermined priority value (e.g., for all service requests with a priority level between 1-6 on a 10-level priority classification). In an alternative or supplemental embodiment, sensor/filter 310 can determine and provide to controller 320 one or more overload values. For example, sensor/filter 310 can provide a first overload value for regular and priority service requests and a second overload value for retransmission requests.

In some embodiments, it can take several overload notification responses to be received at client 120 before the effect of the change in offered load can take effect and can be reflected in the overload notification rate being fed back to client 120. Thus, if the offered rate is altered on every overload notification, it can prematurely alter the offered load, causing overcorrection and/or considerable oscillation in the offered load. In some embodiments, a waiting period $T_{Wait}$ (or a blind interval period) can be introduced after one or more updates are made to the offered load rate, during which overload notifications are not counted. After the end of this waiting period, the overload notifications can be counted towards the overload notification rate.

Control unit 320 can adapt the allowed service request transmission rate towards server 130 so as to keep the average overload value close to a configured target overload value. Thus, the control can be activated as soon as the average overload value exceeds a target overload value. In some embodiments, control unit 320 can be based on the principle of additive-increase/multiplicative decrease (AIMD), which can additively increase the allowed rate with time. On detecting overload, control unit 320 can then reduce the allowed rate multiplicatively by a certain factor. AIMD control schemes can converge to a stable and fair operating point. With an AIMD algorithm, control unit 320 can increase the allowed rate linearly with a fixed size steps to probe for extra capacity, then, when overload is detected, the allowed rate can decrease multiplicatively by a fixed factor (e.g., 0.5).

In some embodiments, control unit 320 can adapt the allowed rates such that the overload value converges quickly to the target overload value. In other embodiments, to ensure fast reaction to the onset of overload, the rate of change of the allowed rate can be made proportional to the deviation of the overload value from the target overload value. For example, control unit 320 can make small changes to the allowed rate when the overload value is close to the configured target rate. Similarly, control unit 320 can make progressively larger changes to the allowed rate as the overload value departs further from the configured target overload value. This scheme can respond rapidly to sudden changes (increases and/or decreases) in the offered service request transmission rate.

In some embodiments, control unit 320 can adapt the allowed service request transmission rate towards server 130 for one or more particular classes of offered service requests 325. For example, control unit 320 can adapt the allowed transmission rate for regular service requests while leaving the allowed transmission rate for priority service requests unchanged. Alternatively, control unit 320 can adapt the allowed transmission rate for all service requests with a priority value less than a predetermined priority value (e.g., for all service requests with a priority level between 1-6 on a 10-level priority classification). In an alternative or supplemental embodiment, control unit 320 can separately adapt the allowed transmission rates for one or more classes of offered service requests 325. For example, the allowed transmission rates for service requests of a first type can be based on a first overload value from sensor/filter 310 and the allowed transmission rate for service requests of a second type can be based on a second overload value from sensor/filter 310.

Actuator 330 can electronically restrict the rate of transmitting service requests 335 based on the output from controller 320. Different mechanisms can be used to implement restriction, for example: (1) percentage rejection; (2) request gapping; and/or (3) leaky bucket. The proportional rejection mechanism can admit a percentage of the offered requests 325, thus the admitted rate can vary as the offered rate changes. Controller 320 can adjust the percentage of allowed service requests to track the offered rate. If using a leaky bucket, controller 320 can update its output less frequently to track the offered rate, which can help the feedback control to stabilize. Request gapping can act similarly to a leaky bucket with a bucket size of one token. In a supplemental embodiment, actuator 330 can include one or more buffers to temporarily store incoming load 325.

In a supplemental or alternative embodiment, actuator 330 can also restrict transmission of service requests based on classification. In one embodiment, overload-friendly retransmissions can include actuator 330 electronically dropping automatic retransmission of one or more offered service requests 325 that is a retransmission from a prior service request. Overload-friendly retransmission can advantageously provide for automatic control of the aggregate rate towards the overloaded server 130, which includes new requests and retransmission of old requests. In addition, overload-friendly retransmission can advantageously prioritize retransmission of high priority requests over transmission of regular requests. In general, actuator 330 can prioritize transmission of service requests based on one or more classifications of the offered service requests 325.

While the components of model control loop 300 are illustrated to be separate in FIG. 3, other configurations can also be used. For example, one or more components of model control loop 300 can be combined into the same unit such as, for example, controller 280. In addition, client 120 can include one or more additional control loops 300. In some cases, the additional control loops 300 can be used to control rates of service request transmissions to one or more additional downstream servers. In supplemental or alternative embodiments, the additional control loops 300 can be used to control rates of service request transmissions for different classes of service to the same server 130.

Figure 4:
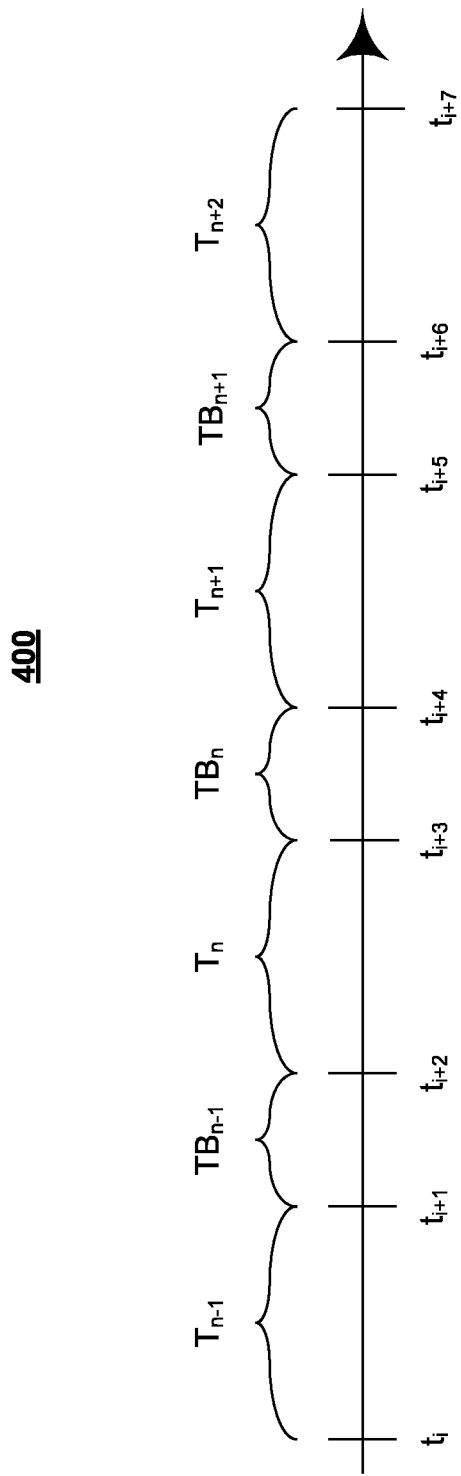
FIG. 4 is a diagram showing windowed time intervals.

FIG. 4 is a diagram 400 showing windowed time intervals. In some embodiments, client-implemented overload control schemes can be time driven. In time driven schemes, overload values can be measured at predetermined times (e.g., $t_i$, $t_{i+1}$, $t_{i+2}$, etc.) and/or during predetermined periods of time (e.g., $T_{n-1}$, $T_n$, $T_{n+1}$, etc.). One or more blind time intervals (e.g., $TB_{n-1}$, $TB_n$, $TB_{n+1}$, etc.) can be included, during which overload values are not measured. In some embodiments, time periods $T_j$ and/or $TB_j$ can be fixed. In other embodiments, time periods $T_j$ and/or $TB_j$ can be variable (e.g., based on system parameters such as known network latencies and/or system bandwidth).

Figure 5:
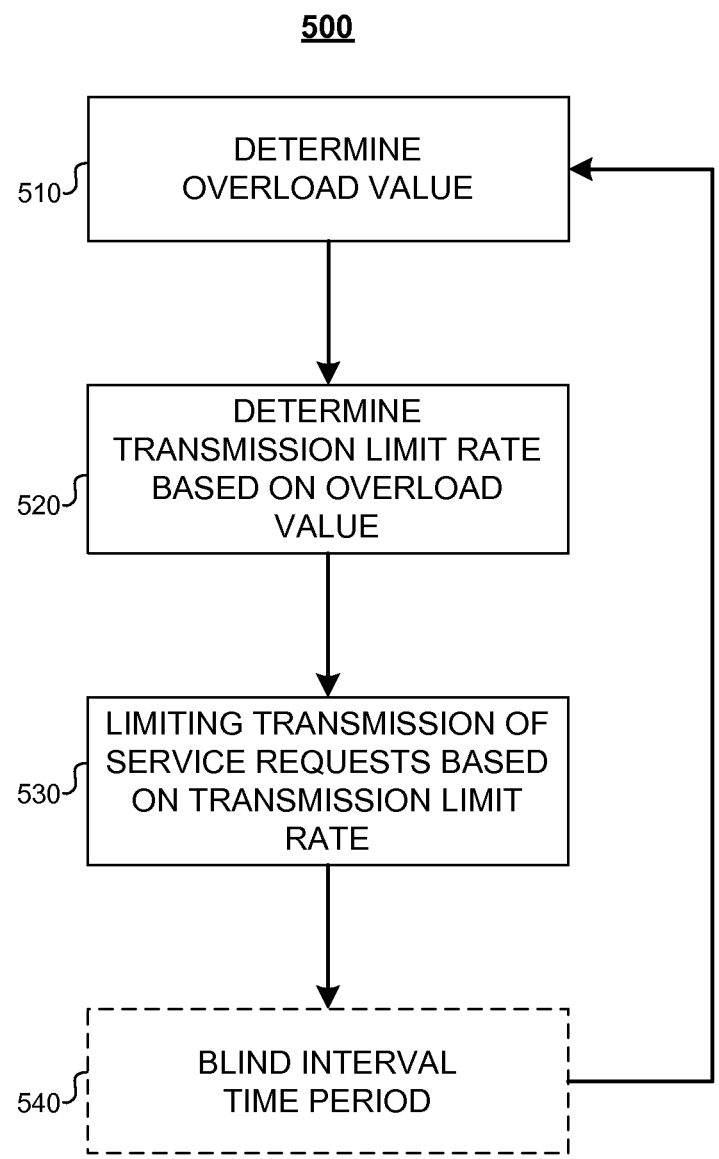
FIGS. 5-6 are flowcharts depicting external control of server resources.

FIG. 5 is a flowchart 500 depicting client-based overload control, performed by controller 280, of client 120. The elements of flowchart 500 are described using the exemplary model control loop 300 of FIG. 3. Limiting server overload via client control includes determining an overload value (510), determining a transmission limit rate based on the overload value (520), limiting transmission of service requests based on the transmission limit rate (530), and/or optionally waiting for a blind interval time period (540) before determining a new overload value (510). In some embodiments, controller 280 can implement the algorithm depicted in flowchart 500 with respect to windowed-time intervals of length T. For example, if the interval of length T is set to be 1 second, then controller 280 performs the elements of flowchart 500 every 1 second. In supplemental or alternative embodiments, controller 280 can implement flowchart 500 on an event-driven basis. For example, if the number of incoming requests 325 received since the last time flowchart 500 was executed exceeds a value N, then controller 280 can execute flowchart 500. The elements of flowchart 500 can be performed separately for one or more protocols or processes within the protocol stack 210-270 of client 120, or can be performed concurrently.

Determining an overload value (510) can be performed by sensor/filter 310. Determining an overload value (510) for time period n, which can be represented as $O_{n-avg}$, can include determining whether at least two or more requests that were previously transmitted to server 130 satisfy an overload criterion. The overload value $O_{n-avg}$ can be stored in, for example, computer memory module 290. In some embodiments, the overload value can be the average number of requests that satisfy an overload criterion, e.g., $$O_{n-avg} = O_{n-measured}/T_n. \quad (2)$$

Generally, the overload value can be any function $f$ (e.g., a smoothing function) based on the number of overload measurements from one or more prior time periods, e.g., $$O_{n-avg} = f(O_{n-measured}, O_{(n-1)-measured}, O_{(n-2)-measured}, \ldots). \quad (3)$$

According to some embodiments, an overload criterion can include receiving an explicit rejection message from server 130, e.g., $O_{n-measured} = \Sigma$rejections. In supplemental or alternative embodiments, an overload criterion can be based on an implicit value such as, for example, time-outs:

$$O_{n-measured} = \sum_{i=1}^{S_n} TIMEOUT_i, \quad (4)$$

where $S_n$ can represent the number of requests sent during one or more current or prior time periods (e.g., time period n), and where $$TIMEOUT_i = \begin{cases} 1 & \text{if } t_{ri} - t_{si} > D \text{ or } t_{measurement} - t_{si} > D \\ 0 & \text{otherwise,} \end{cases} \quad (5)$$

where $t_{si}$ can represent the time that the ith request was sent, $t_{ri}$ can represent the time that a response to the ith request was received, $t_{measured}$ can represent the time of the overload measurement, and D can represent a delay threshold. The delay threshold D can be static (e.g., based on prior knowledge of server 130 delay) and/or dynamic (e.g., variably set by client 120). In some embodiments, a dynamic delay threshold $D_n$ for time n can be $D_n = f_{TO-Delay} R_n$, where $R_n$ can represent an average response time and $f_{TO-Delay}$ can be a safety factor (e.g., $\geq 1$). An average response time can be $R_n = \alpha R_{n-1} + (1-\alpha)d$, where $\alpha$ can represent an averaging factor and d can represent a delay measurement.

In yet other supplemental or alternative embodiments, an overload criterion can be based on an implicit value such as, for example, an out-of-order response:

$$O_{n-measured} = \sum_{i=1}^{S_n} OUT\_OF\_ORDER_i, \quad (6)$$

where $S_n$ can represent the number of requests sent during one or more time period (e.g., time period n), and where $$OUT\_OF\_ORDER_i = \begin{cases} 1 & \text{if } t_{si} < t_{sj} \text{ and } t_{rj} + f < t_{ri} \text{ for } j > i \\ 0 & \text{otherwise,} \end{cases} \quad (7)$$

where $t_{si}$ can represent the time that the ith request was sent, $t_{ri}$ can represent the time that a response to the ith request was received, and $f$ can be a function of $|t_{sj}-t_{si}|$ and/or $|j-i|$. Generally, an overload value can be based on one or more of equations (2)-(7).

Figure 6:
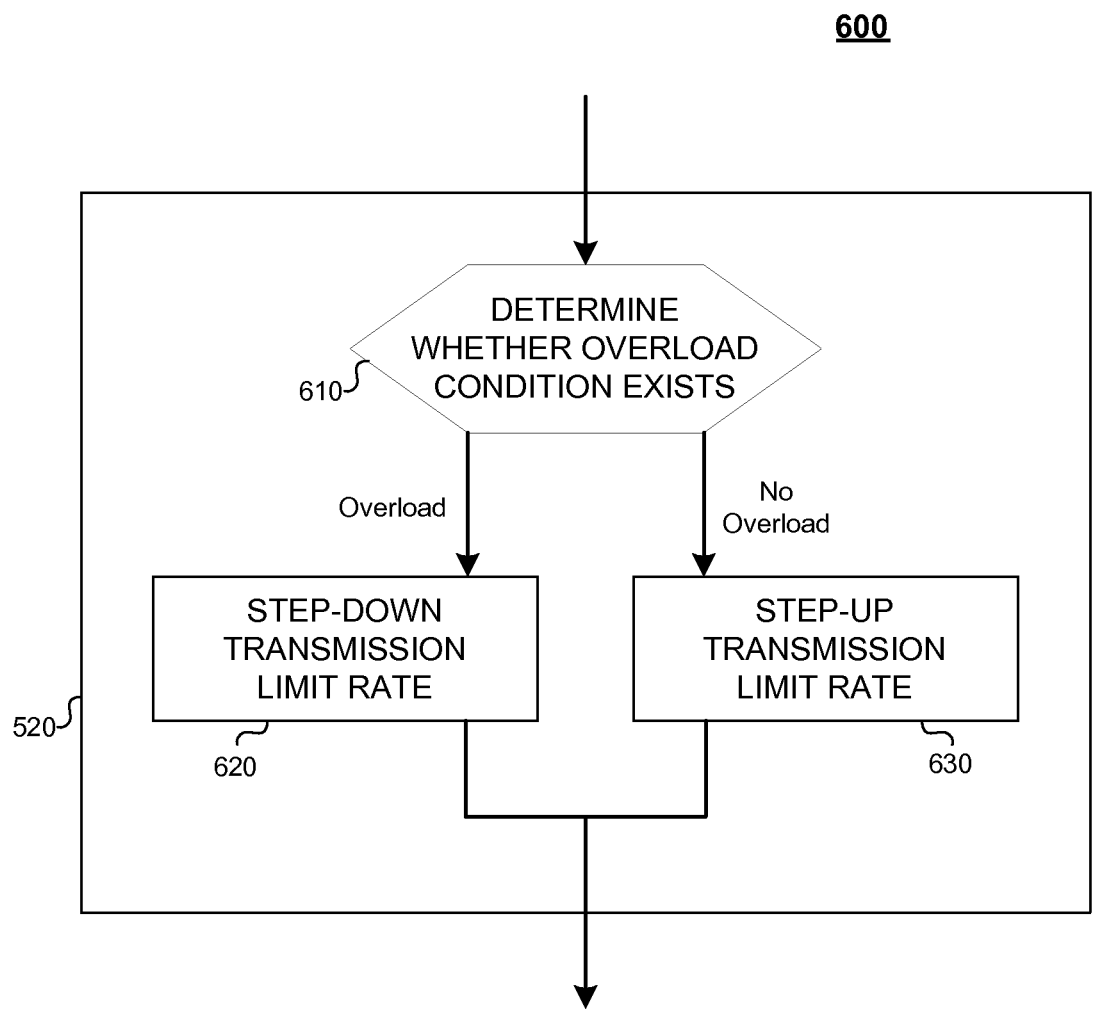

Determining a transmission limit rate based on the overload value (520) can be performed by control unit 320. FIG. 6 is a flowchart 600 depicting determining a transmission limit rate based on the overload value (520). Determining a transmission limit rate can include determining whether an overload condition exists (610). If an overload condition exists, the transmission limit rate can be stepped-down (620). If an overload condition does not exist, the transmission limit rate can be stepped-up (630). Determining whether an overload condition exists (610) can include comparing the overload value with a target overload value 315, which can be represented as $O_{target}$.

According to some embodiments, the transmission limit rate, which can be represented as $\lambda^*_n$ for time period n, can be stepped-down (620) according to $\lambda^*_{n-1} = \lambda^*_n P_{n+1}$, where $P_{n+1}$ can be the percentage of transmission rate:

$$P_{n+1} = P_n \left(1 + G_{SD} \frac{O_{target} - O_{n-avg}}{O_{n-avg}}\right), \quad (8)$$

where $G_{SD}$ can represent a controller step-down gain. In alternative or supplemental embodiments, the transmission rate limit can be stepped-down (620) according to $\lambda^*_{n+1} = \lambda^*_n + G_{SD}(O_{target} - O_{n-avg})$.

When the overload value goes below the target overload value, client 120 can enter a step-up phase (630). The step-up phase (630) can continue if: (1) the overload value is below the target overload value; and (2) the arriving load ($\lambda$) 325 is above the rate allowed at controller 320 ($\lambda^*$). In some embodiments, the step-up phase can be divided into two sub-phases: "overload-recovery" and "overload-prevention." During overload-recovery, controller 320 can try to recover to the average allowed rate before the overload event. During overload-prevention, controller 320 can increase the allowed rate slowly. In supplemental or alternative embodiments, if the arriving load (λ) 325 is below the rate allowed at controller 320 (λ*), then the rate allowed at controller 320 (λ*) can be left unchanged.

The transmission limit rate can be stepped-up (630) according to $\lambda^*_{n+1} = \lambda^*_n + \text{step\_size}$, where step_size can be fixed. Alternatively, step_size can be determined according to step_size=$G_{SU}(\text{rate}_{max} - \lambda^*_n)$, where $G_{SU}$ can represent a step-up gain and where $$\text{rate}_{max} = \begin{cases} \lambda^{avg} & \text{if } \lambda^*_n < \lambda^{avg} \\ \overline{\lambda} & \text{if } \lambda^*_n \geq \lambda^{avg}, \end{cases} \quad (9)$$

where $\overline{\lambda}$ can represent a large pre-configured value that can be based on the maximum share that client 120 can have with server 130, and where $\lambda^{avg}$ can represent the average offered load 325 before entering overload, or before entering the step-down phase. When $\lambda^*_n < \lambda^{avg}$, which can be referred to as "overload recovery," client 120 can attempt to recover to the average offered load before the overload state. When $\lambda^*_n \geq \lambda^{avg}$, which can be referred to as "overload avoidance," client 120 can attempt to probe server 130 to avoid future overload. In an alternative embodiment, $\lambda^{avg}$ can represent the rate of incoming requests 325 at time n. The step_size value can be bounded above at step_size$_{max}$ and/or can be bounded below at step_size$_{min}$. The step-up gain $G_{SU}$ can be fixed and/or variable. For example, $G_{SU}$ can be assigned a lower gain when $\lambda^*_n \geq \lambda_n$ in order to be more conservative. In yet other alternative or supplemental embodiments, step_size can be determined according to step_size=$(\text{rate}_{max} - \lambda^*_n)/2$.

During the probing phase (i.e., step-up phase), if the current offered load 325 exceeds the maximum rate rate$_{max}$ and the maximum rate rate$_{max}$ is below $\overline{\lambda}$, then the maximum rate rate$_{max}$ can be set to $\overline{\lambda}$. During the probing phase, if the average overload value from sensor/filter 310 exceeds the target overload value 315, then client 120 can (re-)enter step-down phase and can record the current transmission limit rate as the current value for the maximum rate rate$_{max}$. For example, client 120 can record the current transmission limit rate as the current value for $\lambda^{avg}$.

The transmission limit rate $\lambda^*_{n+1}$ is passed to actuator 330. Actuator 330 can transmit 335 incoming service requests 325 at a rate limited by (e.g., less than or equal to) the transmission limit rate $\lambda^*_{n+1}$.

Waiting for a blind interval time period (540) before determining a new overload value (510) can be based on a blind time interval, $T_{blind}$, that can be static (e.g., based on prior knowledge of average response time from server 130) and/or dynamic (e.g., variably set by client 120). In some embodiments, a blind time interval can be based on an active measurement of the average request-response delay as follows:

$$R(n+1) = \alpha R(n) + (1-\alpha)d, \quad (10)$$

where $R_n$ can represent average response time, α is averaging factor and d is delay measurement. The blind time interval $T_{blind}$ at time n+1 can be set as follows:

$$T_{blind}(n+1) = f_{blind} R(n+1), \quad (11)$$

where $f_{blind}$ can represent a safety factor greater than or equal to 1. Another method to dynamically set $T_{blind}$ can include saving the sequence number $N_{init}$ and the time of sending the first request after reducing the rate, and initiate $T_{blind}$ at this point. $T_{blind}$ can end after receiving a response for a request that has a sequence N higher than $N_{init}$.

Client 120 can exit overload, setting $\lambda^*_n = \lambda_n$, if it stays for a predetermined amount of time without rejecting new requests and the overload value stays below the target overload value.

III. Computational Results

A quantitative investigation illustrates how client-implemented overload control adapts appropriately under different overload profiles, target server capacities, and load distributions. The simulations below use the packet-level simulator OPNET, which has been extended with an SIP module, as well as modules to implement internal and external overload controls in SIP servers. The SIP model implements SIP RFC 3261. The network topology included user agents (UAs) connected to an edge proxy that forwards the UA requests to a core proxy. Each edge proxy was connected to ten UA clients and ten UA servers. The number of edge and core proxies was varied between different simulation scenarios. Each UA client generated calls which are represented by an INVITE transaction followed by a BYE transaction.

Figure 7:
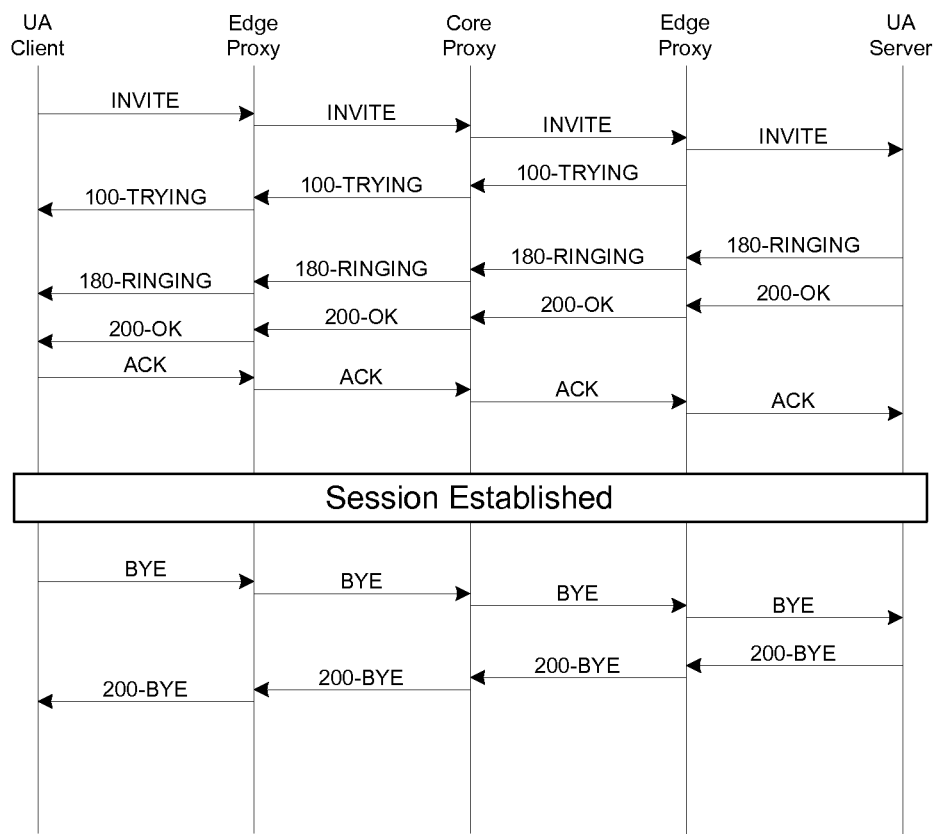
FIG. 7 is a ladder diagram illustrating a simulated model SIP message flow.

FIG. 7 is a ladder diagram 700 illustrating the simulated model SIP message flow for establishing a session. Calls generated at the UA clients follow a Poisson arrival model, and the destination UA server is selected randomly from all the available UA servers in the network. The edge proxy can reject a request if all the core proxies are overloaded. Core proxies can forward the requests to the edge proxy of the destination UA. The proxies can be represented as a finite queue that holds the arriving SIP messages, and serves them (e.g., retransmits them) at a constant rate. This service rate defines the proxy message processing capacity. In this simulation, edge proxies are assumed to have infinite capacity, while core proxies are set to have a finite capacity. This assumption allows the study of the overload behavior at the core proxies and is a reasonable assumption as core proxies process the aggregate load from multiple edge proxies. All of the SIP messages in this simulation are transmitted over UDP, thus ensuring the reliability of messages, via retransmissions, is done by SIP. Table I lists the settings used for the simulation.

TABLE I

Simulation Settings

| | |
|---|---|
| Core Proxy Capacity | 500 messages |
| Core Proxy Queue Size | 500 messages |
| Call Holding Time | 30 seconds |
| Overload Control Termination Timer | 120 seconds |
| Step up Gain ($G_{SU}$) | 0.5 |
| Step down Gain ($G_{SD}$) | 0.8 |
| Additive Increment (aINC) | 10 calls/sec |
| Waiting Period ($T_{blind}$) | 1 second |
| Target Overload Value ($O_{target}$) | 3 |

In the SIP simulation, a full call leads to a load of seven messages though the proxies (five messages for the INVITE transaction and two messages for the BYE transaction). Given the core proxy message processing capacity of 500 messages/sec, the capacity of each core proxy is ~72 calls/sec. In the following results, the proxy/network throughput is used as a performance metric. The throughput represents the rate of successful calls. A call is defined to be successful if the UA client receives the 200-OK in less that 10 seconds, and the UA server receives INVITE-ACK. The call setup delay is defined as the time between sending the initial INVITE request to receiving 200-OK. All simulations were run long enough to ensure the system reached a consistent behavior.

Figure 8:
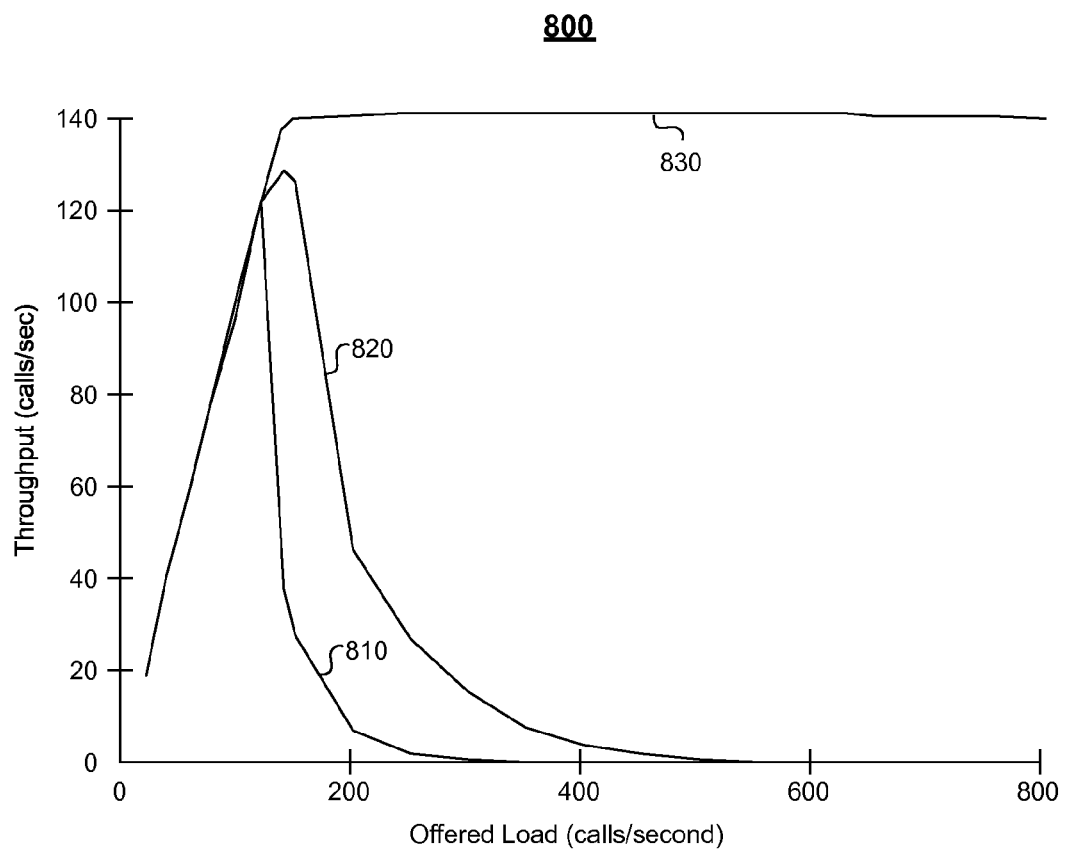
FIG. 8 is two-dimensional plot illustrating throughput versus offered load for different overload control schemes.

FIG. 8 is two-dimensional plot 800 of the results of the simulation illustrating throughput versus offered load for no overload scheme 810, server-based internal overload scheme 820 utilizing a queue-based implementation, and client-based overload scheme 830. Without overload control, the throughput decreases rapidly to zero as the offered load increases above the aggregate capacity of the proxies~142 calls/sec. This is caused by dropped SIP messages due to queue overflow, followed by SIP request retransmissions from upstream clients. Internal overload controls achieve a little bit better throughput than no overload control, because rejecting workload requires less effort than accepting it. Client-based overload control achieves ~142 Calls/Sec throughput.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium 110, which can include any form or medium of digital or analog data communication (e.g., a communication network). Transmission medium 110 can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium 110 can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, and/or other communication protocols.

Devices of the computing system can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). Mobile computing device include, for example, a Blackberry® IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. A method for limiting server overload via client control, the method comprising:
    transmitting, from a client device, a first set of a plurality of requests for services to a server at a first transmission rate during a first period of time;
    limiting, by the client device, the first transmission rate to be less than or equal to a first transmission limit rate during the first period of time;
    determining, by the client device, an overload value based on whether at least two or more requests of the first set of requests for service satisfy an overload criterion said determining including generating an average overload notification rate by averaging overload notifications, said overload notifications including both implicit overload notifications and explicit overload notifications and generating said overload value from said average overload notification rate;
    storing the overload value in a computer memory module coupled to the client device;
    determining, by the client device, a second transmission limit rate based on the overload value and the first transmission limit rate;
    transmitting, from the client device, a second set of a plurality of requests for services to the server at a second transmission rate during a second period of time after the first period of time; and
    limiting, by the client device, the second transmission rate to be less than or equal to the second transmission limit rate during the second period of time.

2. The method of claim 1,
    wherein said implicit overload notifications include messages received from the server that are not intended for overload control purposes, at least one of said implicit overload notifications being a temporarily unavailable message; and
    wherein said explicit overload notifications include messages from the server that are explicit overload messages, at least one of said explicit overload messages being a service not available message.

3. The method of claim 1, further comprising:
    determining, by the client device, whether the overload value is less than or greater than a target overload value; and
    wherein, if the overload value is greater than the target overload value, determining the second transmission limit rate comprises reducing the first transmission limit rate by an amount proportional to the difference between the overload value and the target overload value.

4. The method of claim 1, further comprising:
    determining, by the client device, whether the overload value is less than or eater than a target overload value; and
    wherein, if the overload value is greater than the target overload value, determining the second transmission limit rate comprises reducing the first transmission limit rate by an amount proportional to the overload value.

5. The method of claim 1 wherein said explicit overload notifications include receipt of SIP service-unavailable messages from said server.

6. The method of claim 4 wherein, if the overload value is less than the target overload value, determining the second transmission limit rate comprises increasing the first transmission limit rate by a rate step.

7. The method of claim 6 wherein the rate step is fixed.

8. The method of claim 6 wherein the rate step is based on the first transmission limit rate.

9. The method of claim 8 wherein the rate step is bounded by a maximum rate step and a minimum rate step.

10. The method of claim 1 wherein the overload criterion comprises an explicit overload criterion.

11. The method of claim 10 wherein the explicit overload criterion applies to a single request only.

12. The method of claim 10 wherein the explicit overload criterion specifies a non-throttling client response.

13. The method of claim 10 wherein a first request for service from the first set satisfies the explicit overload criterion if a first rejection message associated with the first request is received by the client device from the server.

14. The method of claim 5 wherein said implicit overload notifications include SIP temporarily unavailable messages received from said server.

15. The method of claim 14 wherein determining the overload value is based on one or more prior overload values associated with one or more periods of time prior to the first period of time.

16. The method of claim 1 wherein transmitting the first set of requests comprises prioritizing transmission of the one or more requests based on request type.

17. The method of claim 16 wherein request type of the one or more requests comprises: high priority, regular, or any combination thereof.

18. The method of claim 1 wherein the first and second set of requests are of the same classification.

19. The method of claim 1 wherein the overload criterion is an implicit overload criterion.

20. The method of claim 1 wherein the client device and the server are located in different computing devices that are separated by a communications network.

21. The method of claim 1 wherein the client device and the server are located in the same computing device and separated by an internal bus to the computing device.

22. The method of claim 19 wherein a first request for service from the first set satisfies the implicit overload criterion if the elapsed time since the first request was transmitted is greater than a delay threshold.

23. The method of claim 19 wherein the implicit overload criterion is satisfied if a fraction of outstanding requests for service in a time interval is equal to or greater than a fractional threshold value.

24. The method of claim 19 wherein the implicit overload criterion is based on one or more response messages from the server that are not associated with peer congestion.

25. The method of 24 wherein the implicit overload criterion is satisfied if a fraction of the one or more responses is equal to or greater than a fractional threshold value.

26. The method of 24 wherein the implicit overload criterion is based on a change in a fraction of the one or more responses that are equal to or greater than a fractional threshold value.

27. The method of claim 22 wherein the delay threshold is static.

28. The method of claim 22 wherein the delay threshold is based on an average response time to one or more prior requests for services transmitted to the server.

29. The method of claim 22 wherein the delay threshold is based on a percentile response time to one or more prior requests for services transmitted to the server.

30. The method of claim 19 wherein a first request for service from the first set satisfies the overload criterion based on whether a second response to a second request for service from the first set is received before a first response to the first request is received, wherein the second request was transmitted to the server after the first request.

31. The method of claim 19 wherein the overload value is further based on an explicit overload criterion,
said explicit overload criterion being based on at least one of a received overload signal, a received overload notification, and a received service unavailable signal.

32. A method for limiting server overload via client control, the method comprising:
transmitting, from a client device, a first set of a plurality of requests for services to a server at a first transmission rate during a first period of time;
limiting, by the client device, the first transmission rate to be less than or equal to a first transmission limit rate during the first period of time;
determining, by the client device, an overload value based on whether at least two or more requests of the first set of requests for service satisfy an overload criterion;
storing the overload value in a computer memory module coupled to the client device;
determining, by the client device, a second transmission limit rate based on the overload value and the first transmission limit rate;
transmitting, from the client device, a second set of a plurality requests for services to the server at a second transmission rate during a second period of time after the first period of time;
limiting, by the client device, the second transmission rate to be less than or equal to the second transmission limit rate during the second period of time;
wherein a first layer entity in the client device determines the overload value and a second layer entity in the client device limits the first transmission rate, the first layer entity being different from the second layer entity; and
wherein the first layer entity comprises a transport layer entity and the second layer entity comprises an application layer entity.

33. A method for limiting server overload via client control, the method comprising:
transmitting, from a client device, a first set of a plurality of requests for services to a server at a first transmission rate during a first period of time;
limiting, by the client device, the first transmission rate to be less than or equal to a first transmission limit rate during the first period of time;
determining, by the client device, an overload value based on whether at least two or more requests of the first set of requests for service satisfy an overload criterion;
storing the overload value in a computer memory module coupled to the client device;
determining, by the client device, a second transmission limit rate based on the overload value and the first transmission limit rate;
transmitting, from the client device, a second set of a plurality requests for services to the server at a second transmission rate during a second period of time after the first period of time, the first period of time being separated from the second period of time by a blind interval period of time; and
limiting, by the client device, the second transmission rate to be less than or equal to the second transmission limit rate during the second period of time.

34. The method of claim 33 wherein the blind interval period of time is: a fixed interval of time, based on an average response time to one or more prior requests for services transmitted to the server, or both a fixed interval of time and based on the average response time to one or more prior requests for services transmitted to the server.

35. A method for limiting server overload via client control, the method comprising:
transmitting, from a client device, a first set of a plurality of requests for services to a server at a first transmission rate during a first period of time;
limiting, by the client device, the first transmission rate to be less than or equal to a first transmission limit rate during the first period of time;
determining, by the client device, an overload value based on whether at least two or more requests of the first set of requests for service satisfy an overload criterion;
storing the overload value in a computer memory module coupled to the client device;
determining, by the client device, a second transmission limit rate based on the overload value and the first transmission limit rate;
transmitting, from the client device, a second set of a plurality requests for services to the server at a second transmission rate during a second period of time after the first period of time;
limiting, by the client device, the second transmission rate to be less than or equal to the second transmission limit rate during the second period of time; and
wherein the first set of requests comprise at least requests of a first and second classification and wherein the second set of requests consist of only requests of the first classification.

36. A system for limiting server overload via client control, the system comprising:
a buffer configured to store a first set of a plurality of requests for service;
a transmitter coupled to the buffer and configured to transmit the one or more requests for service to a server at a transmission rate less than or equal to a transmission limit rate during a first period of time, the server being remotely located from the system via an internal bus or an external communications network; and
a controller having:
computing means for determining an overload value based on whether at least two or more requests of the first set of requests for service satisfy an overload criterion, said computing means generating an average overload notification rate by averaging overload notifications as part of said determining, said overload notifications including both implicit overload notifications and explicit overload notifications and generating said overload value from said average overload notification rate;

computing means for adjusting the transmission limit rate based on the overload value and the transmission limit rate.

37. A computer program product, tangibly embodied in a non-transitory machine-readable storage device, the computer program product including instructions being operable to cause a data processing apparatus to:

transmit a first set of a plurality of requests for services to a server at a first transmission rate during a first period of time, the server being remotely located from the data processing apparatus via an internal bus or an external communications network;

limit the first transmission rate to be less than or equal to a first transmission limit rate during the first period of time;

determine an overload value based on whether at least two or more requests of the first set of requests for service satisfy an overload criterion, determining said overload value including generating an average overload notification rate by averaging overload notifications, said overload notifications including both implicit overload notifications and explicit overload notifications and generating said overload value from said average overload notification rate;

store the overload value in a computer memory module;

determine a second transmission limit rate based on the overload value and the first transmission limit rate;

transmit a second set of a plurality of requests for services to the server at a second transmission rate during a second period of time after the first period of time; and limit the second transmission rate to be less than or equal to the second transmission limit rate during the second period of time.

\* \* \* \* \*